United States Patent [19]
Rider

[11] Patent Number: 6,028,668
[45] Date of Patent: Feb. 22, 2000

[54] FIBER OPTIC GYROSCOPE HAVING IMPROVED READOUT AND MODULATION INDEX CONTROL

[75] Inventor: Billie F. Rider, Mount Vernon, Iowa

[73] Assignee: Rockwell Collins, Inc., Cedar Rapids, Iowa

[21] Appl. No.: 09/018,538

[22] Filed: Feb. 4, 1998

[51] Int. Cl.[7] .................................................. G01C 19/72
[52] U.S. Cl. ............................................................ 356/350
[58] Field of Search ............................................. 356/350

[56] References Cited

U.S. PATENT DOCUMENTS

| | | | |
|---|---|---|---|
| 4,796,993 | 1/1989 | Sonobe et al. | 356/350 |
| 4,883,358 | 11/1989 | Okada | 356/350 |
| 5,202,747 | 4/1993 | Kersey | 356/350 |
| 5,412,472 | 5/1995 | Okada et al. | 356/350 |

*Primary Examiner*—Samuel A. Turner
*Attorney, Agent, or Firm*—Kyle Eppele; James P. O'Shaughnessy

[57] ABSTRACT

An open loop fiber optic gyroscope having improved linearity and scale factor accuracy in the rate signal output and improved modulation index control is disclosed. A digital phase tracker is utilized to derive the Sagnac phase shift from signals proportional to cosine and sine values of the Sagnac phase shift. The rate output is independent of the amplitude of the optical power in the gyroscope and is linear for very large input rates. A modulation servo utilizes the second and fourth harmonic signals from the output of the fiber optic gyroscope to control modulation.

4 Claims, 4 Drawing Sheets

FIBER OPTIC GYROSCOPE HAVING IMPROVED READOUT AND MODULATION INDEX CONTROL

BACKGROUND OF THE INVENTION

The present invention generally relates to fiber optic interferometer gyroscopes, and more particularly to a fiber optic gyroscope having improved readout and modulation index control.

Solid-state interferometer gyroscopes, including Sagnac interferometer gyroscopes which utilize the Sagnac effect, have been becoming of increased interest for widespread utilization in applications such as inertial navigation instruments, attitude and heading indicating or controlling devices, or the like. The Sagnac effect is a term in the electro-optics art describing a phase shift (and consequent measurable rotation rate) caused by nonreciprocity (different optical path lengths) of two counter rotating light waves traveling in the same coil in a fiber optic gyro or ring interferometer.

It was discovered that a convenient light path can be established with the use of an optical fiber formed in a coil or ring encircling an axis of rotational selectivity. Such a gyroscope is taught, for example, in U.S. Pat. No. 4,013,365.

It was later discovered that by modulating the light beams propagating in each counter-rotating direction with respective different frequencies, the signal processing thereof can be accomplished electronically with greater resolution and with a high degree of simplicity at lower, non-lightwave frequencies.

Fiber optic gyroscope apparatuses may serve as an angular speed and attitude detector in an inertial navigation apparatus for an aircraft or the like. Advanced fiber optic gyroscopes such as disclosed by U.S. Pat. No. 4,913,548 are capable of determining both the magnitude (and thereby also the rate) and the direction of rotation the optical fiber ring by examination of the differences in phase information between counter propagating beams in the fiber optic ring.

SUMMARY OF THE INVENTION

The present invention is drawn to improvements in the readouts of fiber optic gyroscopes and in the modulation index control thereof.

It is therefore an object of the invention to provide a fiber optic gyroscope having improved linearity and scale factor accuracy in the rate signal output.

It is another object of the invention to provide a fiber optic gyroscope having improved modulation index control.

The present invention provides a digital phase tracker to derive the Sagnac phase shift from signals proportional to cosine and sine values of the Sagnac phase shift. This approach provides the advantage that the rate output is independent of the amplitude of the optical power in the gyroscope. An additional advantage provided is that the rate output is linear for very large input rates. The present invention further provides a modulation servo which utilizes the second and fourth harmonic signals from the output of the fiber optic gyroscope to control modulation.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to the presently preferred embodiment of the invention, an example of which is illustrated in the accompanying drawings.

Figure 1:
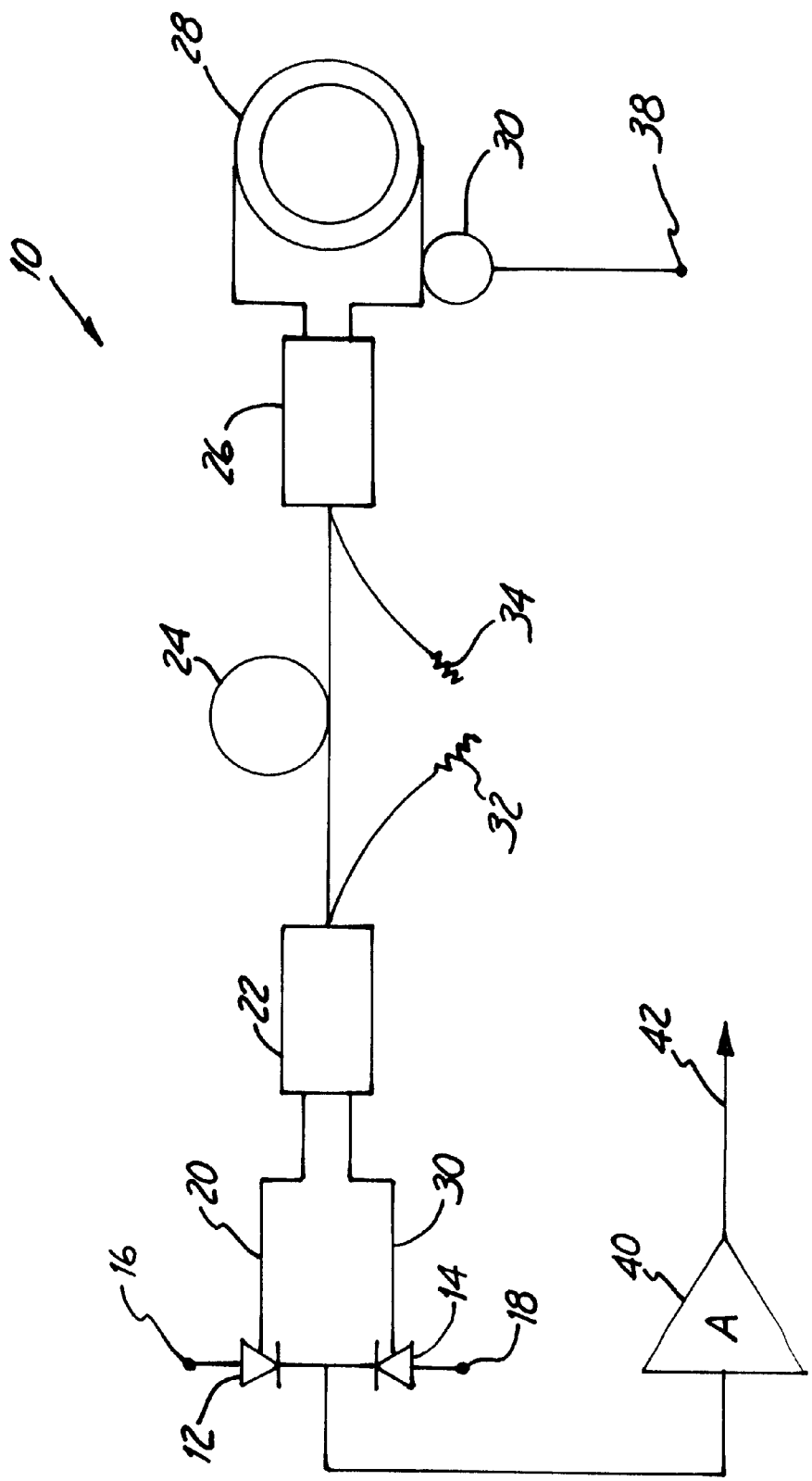
FIG. 1 is a diagrammatic illustration of an open loop fiber optic gyroscope.

Referring now to FIG. 1, there is shown a diagrammatic illustration of an open loop fiber optic gyroscope. The gyroscope 10 includes a superluminescent diode (SLD) 12 which produces a beam that is injected into the fiber optic gyroscope. The light produced by the superluminescent diode 12 enters the gyroscope through a first end of the fiber 20 which feeds into an input/output coupler 22. A photodetector diode 14 detects the light output from the superluminescent diode 12 at a second end of the fiber loop 30. The photodetector diode 14 converts an incoming optical beam into an electrical current. Biasing and control signals may be applied to the superluminescent diode 12 and the photodetector 14 at points 18 and 16 respectively to control the operation thereof. The loop coupler 26 splits the light into clockwise and counter clockwise traveling beams. A polarizer 24 is utilized to reduce light of undesired polarization traveling through the fiber optic gyroscope 10. It is important that there should be only one optical path through the Sagnac interferometer, comprising the polarizer 24, coupler 26 and fiber coil 28. It is also desirable to reduce the likelihood that any discontinuity to the guided light wave, such as that produced by a splice or by the fused region of the coupler, will couple optical power from one mode in the elliptical fiber to the orthogonal mode which has a different propagation constant. The light beam feeds into a fiber coil 28 and propagates in both the clockwise and counterclockwise directions.

The phase of the light is modulated by a phase modulator 36 which receives a modulation input 38. Rotation of the fiber coil 28 of the fiber optic gyroscope 10 results in a differential Sagnac phase shift between the clockwise and counter clockwise traveling beams. The Sagnac differential phase shift may be expressed as:

$$\phi_s = (2\pi DL/\lambda c) \cdot \text{RATE} \qquad \text{EQ. 1}$$

where $\phi_s$ is the differential Sagnac phase shift, L is the coil length, D is the coil diameter, $\lambda$ is the optical wavelength, and c is the speed of propagation of light in a vacuum. The phase modulator 36 produces a nonreciprocal phase shift having a magnitude of $\phi_m$ at a frequency of $\omega_m$.

The interfering clockwise and counter clockwise propagating beams produce an output signal at the photodetector. The signals available at the output 42 of the fiber optic gyroscope 10 vary with the sine and cosine of the Sagnac phase shift $\phi_s$. The ideal (noise free) signal output $I_D$ of the photodetector contains all of the information from the fiber optic gyroscope including magnitude and direction of rotation and is given as:

$$I_D(t) = 1/2 I_o(1 + J_o(\phi_m)\cos\phi_s) - \quad \text{EQ. 2}$$
$$I_o I_1(\phi_m)\sin\phi_s\cos(\omega_m t + \alpha_1) +$$
$$I_o J_2(\phi_m)\cos\phi_s\cos(2\omega_m t + \alpha_2) -$$
$$I_o J_3(\phi_m)\sin\phi_s\cos(3\omega_m t + \alpha_3) +$$
$$I_o J_4(\phi_m)\cos\phi_s\cos(4\omega_m t + \alpha_4)$$

where $I_O$ is the dc intensity output of the photodetector 14 in the absence of modulation and $J_i(\phi_m)$ is the $i^{th}$ Bessel function evaluated at an angle of $\phi_m$.

The composite signal from the fiber optic gyroscope 10 has the form as shown above expressed in terms of current and may further include other harmonic components and noise not of interest. The ac component of the current signal is preferably converted to a voltage signal which is sampled for analysis. The voltage at each sample n may be expressed as:

$$V_n = S_1 \sin(\phi_n + \alpha_1) + S_2 \sin(2\phi_n + \alpha_2) + S_3 \sin(2\phi_n + \alpha_3) + S_4 \sin(4\phi_n + \alpha_2) + \text{noise} \quad \text{EQ. 3}$$

where $$S_1 = K_1 J_1(\phi_m) \sin(\phi_s);$$
$$S_2 = K_2 J_2(\phi_m) \cos(\phi_s);$$
$$S_3 = K_3 J_3(\phi_m) \sin(\phi_s);$$

and $$S_4 = K_4 J_4(\phi_m) \cos(\phi_s); \quad \text{EQ. 4}$$

The scalar terms $K_1$ to $K_4$ depend on the light amplitude, the sensitivity of the photodetector and the gain at the relevant frequency. $\phi_n$ is the phase of the modulation at the time of the sample n. The output of the photodetector 14 is amplified with a preamplifier 40 to provide an output 42 at a sufficient level for performing signal processing. As noted, $\phi_m$ is the magnitude of the phase shift induced by the phase modulator 36. This phase shift is controlled by the signal amplitude driving the phase modulator 36. The Sagnac phase shift $\phi_s$ is proportional to the rate of rotation of the fiber ring 28 to be measured. Therefore, the value of the Sagnac phase shift $\phi_s$ is the quantity to be determined. The phase shift $\phi_s$ is linearly related to the rate of rotation by the physical characteristics of the design of the fiber optic gyroscope, described as:

$$\text{RATE} = \phi_s \lambda c / 2 \pi DL \quad \text{EQ. 5}$$

where D is the effective diameter of the fiber ring 28, L is the length of the fiber, $\lambda$ is the effective wavelength, and c is the speed of propagation of light in a vacuum. Because $\phi_s$ is linear with respect to the rotational rate, the method for determining $\phi_s$ of the present invention preferably provides a linear rate signal output. Additionally, the required phase modulation may drift over time. Therefore, a method of controlling the phase modulation amplitude $\phi_m$ is provided.

It is well known that the optical scale factor ($\lambda c/2 \pi DL$) and modulation depth must be tightly controlled and/or compensated in order to minimize scale factor variation with temperature.

Figure 2:
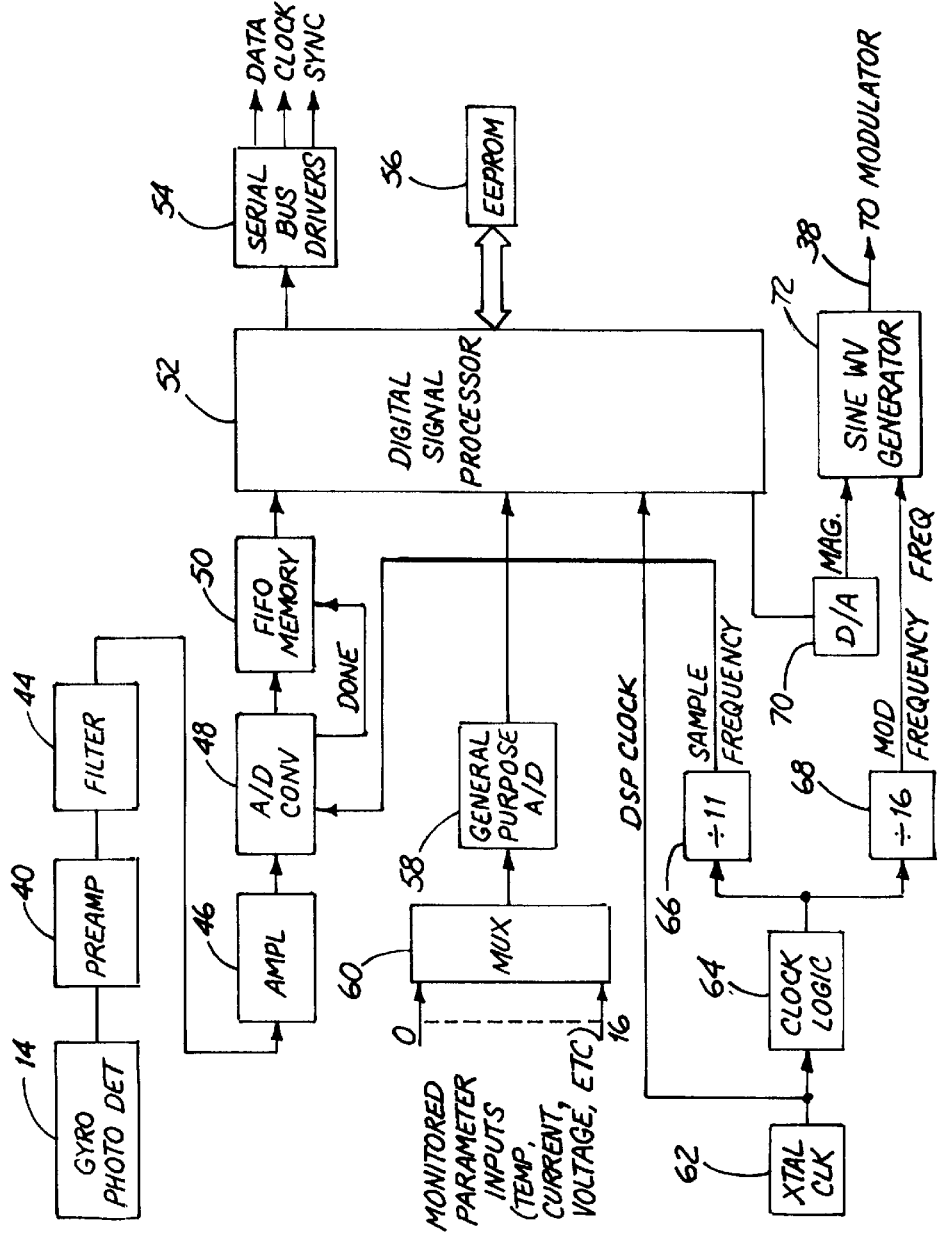
FIG. 2 is a block diagram of the electronics of the fiber optic gyroscope of the present invention.

Referring now to FIG. 2, a block diagram of the electronics of the fiber optic gyroscope 10 of FIG. 1 is shown. The gyroscope photodetector ("GYRO PHOTO DET") 14 provides the modulated signal to a preamplifier ("PREAMP") 40 which amplifies the signal to a suitable level for signal processing. The output of the preamplifier 40 is fed into a filter ("FILTER") 44 for removing undesirable frequency components from the signal before amplification by amplifier ("AMPLIFIER") 46. The bandwidth of the amplifiers and filters includes the first through the fourth harmonics of the modulation frequency. The output signal of the amplifier 46 is fed into an analog-to-digital converter ("A/D CONV") 48 which converts the signal into a discrete valued signal proportional to the analog value thereof. The output of the analog-to-digital converter 48 is fed into a first-in, first-out memory buffer ("FIFO MEMORY") 50. The A/D converter 48 provides a completion signal ("DONE") to the FIFO memory buffer 50 indicating when a sampling of the phase shift signal is completed. The output of the memory buffer 50 is received by a digital signal processor ("DIGITAL SIGNAL PROCESSOR") 52 for fast execution of signal processing algorithms. The digital signal processor 52 controls a serial bus and drivers ("SERIAL BUS DRIVERS") 54 which in turn provides data ("DATA"), clock ("CLOCK") and synchronization ("SYNC") output signals for example. The digital signal processor 52 may operate from code stored in an electrically erasable programmable read-only memory ("EEPROM") 56.

The electronics of the fiber optic gyroscope as shown in FIG. 2 preferably monitor parameters which may affect the readings of the fiber optic gyro such as temperature ("TEMP"), current drift ("CURRENT"), voltage drift ("VOLTAGE") etc. The monitored parameters are input into a 16-to-1 multiplexer ("MUX") 60 the output of which is fed into a general purpose analog-to-digital converter ("GENERAL PURPOSE A/D") 58 before being fed to the digital signal processor 52. A crystal clock ("XTAL CLK") 62 provides a timing reference signal as a clock signal ("DSP CLOCK") to the drive the digital signal processor 52. The timing reference signal may be divided by a factor of 11 ("DIVIDE BY 11") 66 to provide a reference sampling frequency to the phase shift signal A/D converter 48. The timing reference signal may also be divided by a factor of 16 ("DIVIDE BY 16") 68 to provide a modulating frequency reference signal ("MODULATION FREQUENCY") to the frequency input ("FREQ") of a sine wave generator ("SINE WV GENERATOR") 72. The digital signal processor 52 provides a modulating magnitude signal (MAG) that is converted into an analog signal with a digital-to-analog converter 70 and then passed to the sine wave generator 72 to control the modulation level. The output 38 of the sine wave generator 72 is fed into the modulator 36 of the fiber optic gyroscope 10 of FIG. 1.

Figure 3:
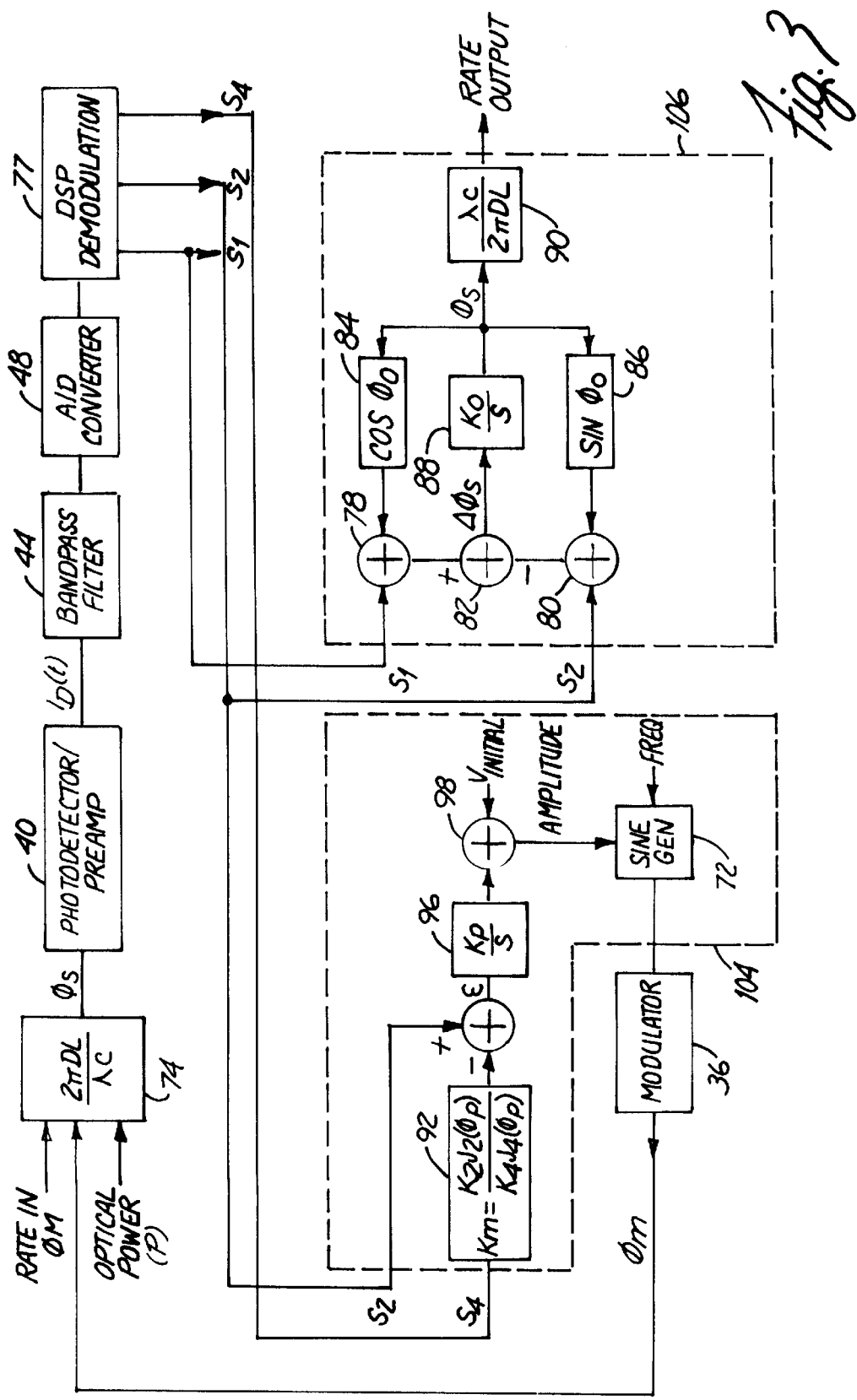
FIG. 3 is a signal processing flow diagram of the Sagnac phase tracker also illustrating the operation of the modulation control processing of the present invention.

FIG. 3 is a signal flow diagram which illustrates the details of the operation of the digital Sagnac phase tracker 106 as well as the modulation controller 104. The purpose of the digital Sagnac phase tracker 106 is to determine the Sagnac phase shift $\phi_s$ due to physical input rate of rotation. The rate output is linearly proportional to the phase shift $\phi_s$.

The signal flow diagram of FIG. 3 illustrates the determination of the solution to the Sagnac phase shift $\phi_s$ and the control of phase modulation amplitude $\phi_m$. The functions illustrated by the diagram of FIG. 3 are carried out in the fiber optic gyroscope 10 and its electronics shown in FIG. 2. The fiber optic gyroscope 10 is functionally represented by its Sagnac sensitivity shown as block 74 in FIG. 3. The physical rotational rate ("RATE IN") is sensed by the fiber optic gyroscope 10 and results in a Sagnac phase shift $\phi_s$. The gyro's Sagnac sensitivity 74 (2 $\pi DL/\lambda c$) provides an initial estimate of the Sagnac phase shift value $\phi_s$. The Sagnac phase shift signal $\phi_s$ is amplified by the preamplifier 40, band-pass filtered 44, and digitized by the A/D converter 48. The phase shift $\phi_s$ data is contained in the samples described in equations 3 and 4. The digital signal processor demodulation function 77 demodulates the signal from the samples and determines the values of $S_1$, $S_2$, and $S_4$. These values are further used in the digital signal processor 52 of FIG. 2 to perform the functions of the phase tracker 106 and the modulation controller 104 illustrated in FIG. 3. The optical power signal ("OPTICAL POWER") P corresponds to the input power value to the fiber optic gyroscope 10, and $\phi_m$ is the phase shift induced by the phase modulator 36. The illustrated approach described here may be implemented for phase shift modulation values of $\phi_m$ over a broad range.

In the flow diagram of FIG. 3 the implementation of the digital Sagnac phase tracker 106 is shown. The DSP demodulation function 77 outputs are defined as:

$$S_1 = K_1 I J_1(\phi_m) \sin \phi_s$$

$$S_2 = K_2 I J_2(\phi_m) \cos \phi_s$$

$$S_4 = K_4 I J_4(\phi_m) \cos \phi_s \qquad \text{EQ. 6}$$

where $S_1$, $S_2$, and $S_4$ are the amplitudes of the fundamental, second, and fourth harmonics at the output of the digital demodulation process. $K_1$, $K_2$, and $K_4$ are the effective gains at the fundamental modulator drive, second harmonic, and fourth harmonic respectively. I is a constant proportional to the optical power out of the interferometer. The Sagnac tracker 106 uses the $S_1$ and $S_2$ outputs.

The Sagnac phase tracking process maintains an estimated value of the Sagnac phase shift $\phi_S$ named $\phi_O$. The estimated phase shift value $\phi_O$ is continuously recalculated by the feedback arrangement shown to successively approximate and maintain the actual Sagnac phase shift value $\phi_S$. The cosine 84 of the estimated phase shift $\phi_O$ is multiplied by the value of $S_1$ at multiplier 78 and added to a summing element 82. The sine 86 of the estimated phase shift $\phi_O$ is multiplied by the negative value of $S_2$ and subtractively added to summing element 82. The output of the summing element 82 is the error signal $\Delta\phi_S$. When the value of $\phi_O$ is equal to $\phi_S$, the error signal $\Delta\phi_S$ is zero valued. $\Delta\phi_S$ is passed through integrator ("$K_O/s$") 88 and then added to the value of $\phi_O$. By carrying out the feedback operations indicated in the flow diagram, the value of $\phi_O$ tracks $\phi_S$ so it is therefore a valid output. The estimated phase shift $\phi_O$ is rescaled 90 by a gain of $\lambda c/(2\pi DL)$ in the processor to arrive at a value for the rate signal output ("SIGNAL RATE OUT"). Thus the digital phase tracker 106 is utilized to derive the Sagnac phase shift from signals $S_1$ and $S_2$ proportional to cosine and sine values of the Sagnac phase shift. This approach provides the advantage that the rate output is independent of the amplitude of the optical power in the gyroscope 10. Another advantage provided is that the rate output is linear with large input rates.

Operation of the modulation control processing is shown in the as block 104 of FIG. 3. The modulator 36 is driven by a sine wave generator at a fixed frequency (for instance 135 kHz). The amplitude of the sine wave is controlled by the modulation controller 104 to set the value of $\phi_m$ to the desired value $\phi_P$. The predetermined modulation operating point $\phi_P$ is controlled by setting a fixed gain in amplifier 92. That gain $K_m$ is set to $K_2 J_2(\phi_P)/K_4 J_4(\phi_P)$.

$S_2$ and $S_4$ are utilized in modulation control. At the predetermined modulation operating point where the phase modulation amplitude $\phi_m$ equals 2.63 radians, the ratio of $J_2(\phi_m)$ to $J_4(\phi_m)$ is about 5.3. Assuming that the gain through the photodetector, preamplifiers and demodulators ($K_2$ and $K_4$) are equal for both harmonic signals $S_2$ and $S_4$, the $S_4$ signal is amplified by $K_m = K_2(\phi_m)/K_4(\phi_m)$ by amplifier 92. The amplified $S_4$ signal is compared to the $S_2$ signal by subtracting the amplified $S_4$ signal from the $S_2$ signal at summing element 94. The resulting output of the summing element 94 is the modulation error signal $\epsilon$. The modulation error signal E indicates whether the modulation is too high or too low. The modulation controller nulls the values of $\epsilon$ and $\epsilon=0$ at $\phi_m=\phi_p$ if $K_4 I J_4(\phi_m)[J_2(\phi_p)/J_4(\phi_p)] = K_2 I J_2(\phi_m)$. The modulation error signal $\epsilon$ is passed to integrator 96 ("Kp/s") and added to the modulation control signal initial value at summing element 98 thereby increasing or decreasing the value thereof. The modulator control signal from the summing element 98 is a dc voltage fed to the amplitude controlled sine generator 72. The modulator control signal is applied to increase or decrease the drive to the modulator 36 of the fiber optic gyroscope 10. The feedback approach with the modulation servo of the present invention maintains the modulation amplitude at a constant value. Without feedback, the modulation amplitude will drift with time and temperature.

Figure 4:
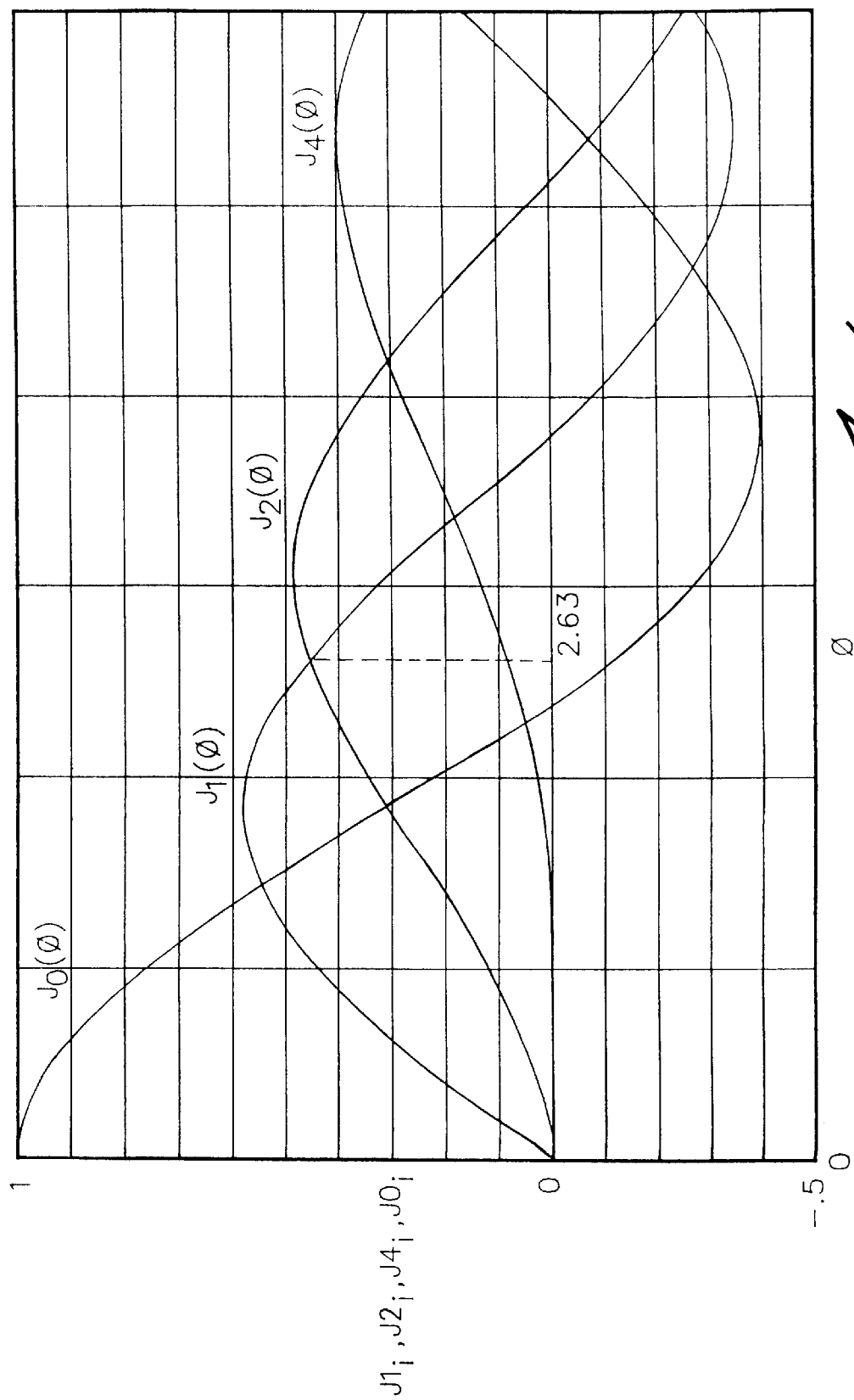
FIG. 4 is a plot of the Bessel functions with respect to the modulation amplitude of the present invention.

Referring now to FIG. 4, a plot of the Bessel functions with respect to the modulation amplitude of the present invention is illustrated. When the phase modulation amplitude $\phi_m$ is approximately 2.63 radians, the amplitudes of Bessel functions $J_1(\phi_m)$ and $J_2(\phi_m)$ are equal. The operation as described herein preferably utilizes a phase modulation where $\phi_m$ is preferably approximately 2.63 radians. FIG. 4 illustrates how the Bessel functions vary with the phase modulation amplitude $\phi_m$. At the point where the amplitudes of $J_1(\phi_m)$ and $J_2(\phi_m)$ are equal, the magnitudes of the first and second harmonic gains in the system will be approximately equal. Operation at other values of $\phi_m$ are possible simply by selection of gain $K_m$. In applications where the value of $\phi_s$ never approaches 90 degrees (1.57 radians), it is possible to operate with the value of $\phi_m$ at about 1.84 radians where $J_1(\phi_m)$ is at its peak. In this case, the gain $K_m$ would be adjusted accordingly.

It is believed that the open loop fiber optic gyroscope having improved readout and modulation index control of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A fiber optic gyroscope system for producing a rate output signal comprising:

a fiber optic gyroscope having a modulator and counter propagating waves for providing an output signal derived from a Sagnac phase shift between said counter propagating waves, said output being proportional to the rate of rotation of said fiber optic gyroscope;

a demodulator for demodulating said output signal into a first harmonic signal, a second harmonic signal, and a fourth harmonic signal;

a modulation controller for modulating the fiber optic gyroscope at a predetermined modulation phase shift established from the second harmonic signal and the fourth harmonic signal; and a phase tracker for tracking the first harmonic signal and the second harmonic signal to produce the rate output signal when the fiber optic gyroscope is modulated at the predetermined modulation phase shift.

2. A fiber optic gyroscope as claimed in claim 1, wherein the modulation controller further comprises:
- an amplifier for amplifying the fourth harmonic signal by a ratio of a second harmonic Bessel function and a fourth harmonic Bessel function;
- a summing element for subtracting the amplified fourth harmonic signal from the second harmonic signal to generate a modulation error signal;
- an integrator for integrating the modulation error signal;
- a second summing element for summing the integrated modulation error signal with an initial modulation control signal to generate a modulator control signal; and
- a sine generator for generating a modulation input signal for modulating the fiber optic gyroscope, said modulation input signal having an amplitude controlled by the modulator control signal to maintain the predetermined modulation phase shift.

3. The fiber optic gyroscope as claimed in claim 2 wherein the predetermined modulation phase shift is approximately 2.63 radians.

4. A method for modulating the counter propagating waves of a fiber optic gyroscope with a modulation phase shift wherein the fiber optic gyro produces an output signal containing rotational rate information, the method comprising:
- calculating a second harmonic signal and a fourth harmonic signal derived from the output signal containing a Sagnac phase shift value and the modulation phase shift;
- amplifying said fourth harmonic signal by the ratio of a second harmonic Bessel function of the output signal to a fourth harmonic Bessel function of the output signal each being evaluated at an angel corresponding to the modulation phase shift;
- determining changes in the modulation phase shift by subtracting said amplified fourth harmonic signal from said second harmonic signal thereby producing a modulation error signal representative of the changes in the modulation phase shift; and
- correcting the modulation phase shift by adding said modulation error signal to said modulation phase shift whereby said modulation phase shift is maintained at a constant value.

* * * * *